United States Patent
Yang et al.

(10) Patent No.: US 11,384,026 B1
(45) Date of Patent: Jul. 12, 2022

(54) HOT REPAIR MATERIAL OF REFRACTORY MATERIALS

(71) Applicant: Naval University of Engineering, Wuhan (CN)

(72) Inventors: Zichun Yang, Wuhan (CN); Guobing Chen, Wuhan (CN); Feiyue Yang, Wuhan (CN); Shuang Zhao, Wuhan (CN); Zhifang Fei, Wuhan (CN); Jun Chen, Wuhan (CN); Jun Li, Wuhan (CN); Lei Zhang, Wuhan (CN); Kunfeng Li, Wuhan (CN); Wencai Sun, Wuhan (CN)

(73) Assignee: NAVAL UNIVERSITY OF ENGINEERING, Wuhan (CN)

( * ) Notice: Subject to any disclaimer, the term of this patent is extended or adjusted under 35 U.S.C. 154(b) by 0 days.

(21) Appl. No.: 17/684,703

(22) Filed: Mar. 2, 2022

(30) Foreign Application Priority Data

Jul. 13, 2021 (CN) .......................... 202110787639.9

(51) Int. Cl.
*C04B 35/66* (2006.01)
*C04B 35/565* (2006.01)
(Continued)

(52) U.S. Cl.
CPC ...... *C04B 35/565* (2013.01); *C04B 35/62222* (2013.01); *C04B 35/63448* (2013.01); *C04B 41/009* (2013.01); *C04B 41/5059* (2013.01); *C04B 41/87* (2013.01); *C04B 2235/3224* (2013.01); *C04B 2235/3239* (2013.01); *C04B 2235/3418* (2013.01); *C04B 2235/3427* (2013.01); *C04B 2235/3826* (2013.01); *C04B 2235/3873* (2013.01);
(Continued)

(58) Field of Classification Search
CPC .......... C04B 35/565; C04B 2235/3224; C04B 2235/3239; C04B 2235/3418; C04B 2235/3427; C04B 2235/3826; C04B 2235/3873; C04B 2235/428; C04B 2235/448; C04B 2235/5427; C04B 2235/5472
See application file for complete search history.

(56) References Cited

U.S. PATENT DOCUMENTS 8,097,547 B2 * 1/2012 Jorge ..................... C25C 3/085
204/243.1

* cited by examiner

*Primary Examiner* — Karl E Group
*Assistant Examiner* — Cameron K Miller
(74) *Attorney, Agent, or Firm* — WPAT, PC

(57) ABSTRACT

A hot repair material of refractory materials is provided and includes main materials and binding agents. The main materials include silicon carbide powders with six different particle sizes and a mass ratio according to particle sizes from large to small is 8:5:8:15:8:10. The binding agents include silicon nitride powders, a sodium silicate powder, an aluminum phosphate powder, a furfuryl alcohol, a silicone resin powder, a silica sol powder, an aluminum sol powder, a silicon oxide micronized powder, a vanadium oxide powder, a silicon powder, a borax and a rare earth oxide micronized powder, and a corresponding mass ratio is 20:10:4:1:5:1:1:2:0.5:0.5:0.5:0.5. The silicon carbide powders in the main materials have a good synergistic effect to improve strength of the repair material. The binding agents include low-, medium- and high-temperature binding agents for a full range of temperatures, so the repair material could gain strength continuously without a collapse temperature.

5 Claims, 1 Drawing Sheet

(51) Int. Cl.
*C04B 35/634* (2006.01)
*C04B 41/00* (2006.01)
*C04B 41/50* (2006.01)
*C04B 41/87* (2006.01)
*C04B 35/622* (2006.01)

(52) U.S. Cl.
CPC .. *C04B 2235/428* (2013.01); *C04B 2235/447* (2013.01); *C04B 2235/448* (2013.01); *C04B 2235/5427* (2013.01); *C04B 2235/5472* (2013.01); *C04B 2235/9669* (2013.01)

HOT REPAIR MATERIAL OF REFRACTORY MATERIALS

TECHNICAL FIELD

The application belongs to the technical field of rapid repair of refractory materials, and particularly relates to a hot repair material of refractory materials.

BACKGROUND

Refractory materials are inorganic nonmetallic materials with a fire resistance of not less than 1,580° C., which are widely used in industrial fields including power, metallurgy, chemical industry, petroleum, machinery manufacturing, silicate, etc. A silicon carbide refractory material used in a supercharged boiler of a ship is a fragile component, which is more likely to fall off and collapse when the ship is subjected to shocks and vibrations, directly resulting in shutdown of the supercharged boiler and power failure, so repair must be carried out as soon as possible. However, as the boiler chamber is at a high temperature, it will take 30 hours before people can perform repair and replacement even with forced ventilation, which obviously fails to meet the requirements of continuous operation. Therefore, it is of great importance to carry out research on rapid hot repair technology.

The repair material is an irregular refractory material made up of refractory materials with a certain granularity, chemical binding agents and admixtures, and is used to repair the lining of thermal equipment (e.g., supercharged boilers) by spraying construction. The refractory material of the special compositions was mechanically repaired on the lining surface to prevent lining erosion, and the repaired material layer is subjected to the thermal load of the boiler to protect the refractory lining from flames etc. Repair on boilers at high temperatures includes two types: emergency repair of local depressions and corrosion pits, and systematic repair of the entire surface. Various repair methods are defined depending on the state of the material in the repair process, including flame repairing, dry repairing, semi-dry repairing and wet repairing. The flame repairing is to use materials in the flame, melt it into a plastic state and shoot it onto the surface; in this way, the furnace lining is repaired in a hot state, which has little damage to the original lining and easy sintering of the spraying layer; the material has a long service life, but the cost is high and the process is not mature. The dry repairing refers to delivering dry powder without water and adding water to the nozzle. Although this method is widely adopted, there are disadvantages such as much dust and rebound and poor construction performance. The semi-dry repairing means mixing the mixture with water through the eyelet of the water ring of the gun and spraying by compressed air onto the repairing surface, and has a high bulk density of the repairing layer and low shrinkage; and in this way the repairing layer is relatively thick with good durability, but the rebound rate is still high.

The wet repairing is widely used, which has emerged in recent years. The wet repairing refers to mixing refractory aggregates, substrates, bonding agents and additives with water to make a slurry, and spraying the slurry onto the repair surface by compressed air. In the late 1970's, the wet repairing was introduced to all types of furnaces; however, due to construction and material performance problems, the wet repairing is limited to a very small area of application. Since the 1990s, the new wet repairing technology has been used first on ladles and has so far been applied to a wide range of kilns in many industries, including metallurgical furnaces, combustion furnaces and cement manufacturing, and has been praised. The repairing technology has the following features: repairing furnace linings of any thickness; the lining having the same densities as that of pouring construction; high construction efficiency, minimal rebound losses and dust-free construction. It is fair to say that the wet repairing is the mainstream of the future development. Yet the wet repairing performance is greatly influenced by the quality of the repair material. Currently repair materials for the wet repairing are mainly single-component aggregates supplemented by one or two binding agents with similar properties. It is difficult for the repair materials with present composition and ratio of raw materials to meet the engineering requirements of the hot repair method of the wet repairing, and moreover the repair layer has poor cohesional strength and rupture strength, so there is a great need to improve the formulation of the repair materials for the wet repairing in the traditional sense.

SUMMARY

A hot repair material of silicon carbide refractory materials is provided in combination with the physicochemical property composition, damage mode and failure mechanism of the silicon carbide refractory materials in supercharged boilers, and by proportioning with a certain amount of silicon carbides with different particle sizes, which has good synergistic effect, the strength of the repair material can be strengthened, and the preferred composite binding agents applicable to the full temperature range allows the repair material to gain strength continuously without a collapse temperature. The problem of rapid hot repairing of silicon carbide refractory materials in the supercharged boilers can hence be solved.

To achieve the above objectives, the application provides the following technical schemes:

according to the technical scheme of the application, a hot repair material of refractory materials includes main materials and binding agents as raw materials, the main materials include silicon carbide powders with different particle sizes, and the binding agent includes silicon nitride powders, a sodium silicate powder, an aluminium phosphate powder, a furfuryl alcohol, a resin powder, sol powders, a silicon oxide micronized powder, a vanadium oxide powder, a silicon powder, a borax and a rare earth oxide micronized powder.

In an embodiment, a particle size of each of the silicon carbide powders with the different particle sizes is 3-0.038 millimeters (mm), and the silicon carbide powders with different particle sizes includes silicon carbides with six different particle sizes.

In an embodiment, the six different particle sizes are six selected from the group consisting of 2.5-3 mm, 2-2.5 mm, 1.25-2 mm, 1-1.25 mm, 0.9-1 mm, 0.8-0.9 mm, 0.6-0.8 mm, 0.5-0.6 mm, 0.4-0.5 mm, 0.3-0.4 mm, 0.25-0.3 mm, 0.2-0.25 mm, 0.15-0.2 mm, 0.1-0.15 mm, 0.044-0.074 mm and 0.038-0.044 mm.

In an embodiment, a mass ratio of the silicon carbides with the six different particle sizes according to particle sizes from large to small is 8:5:8:15:8:10.

In an embodiment, the six different particle sizes include one selected from the group consisting of 2.5-3 mm, 2-2.5 mm, 1.25-2 mm and 1-1.25 mm, one selected from the group consisting of 0.9-1 mm, 0.8-0.9 mm, 0.6-0.8 mm and 0.5-0.6 mm, one selected from the group consisting of 0.4-0.5 mm, 0.3-0.4 mm and 0.25-0.3 mm, one selected from the group consisting of 0.2-0.25 mm, 0.15-0.2 mm and 0.1-0.15 mm, and additionally 0.044-0.074 mm and 0.038-0.044 mm.

In an embodiment, the resin powder is a silicone resin powder, and the sol powders include a silica sol powder and an aluminium sol powder.

In an embodiment, a particle size of each of the silicon nitride powders is less than or equal to 0.5 mm, specifically the silicon nitride powders include silicon nitrides with two different particle sizes, the two different particle sizes are selected from one of following four types: less than or equal to 0.044 mm and 0.044-0.15 mm; less than or equal to 0.044 mm and 0.15-0.25 mm; less than or equal to 0.044 mm and 0.25-0.4 mm; and less than or equal to 0.044 mm and 0.4-0.5 mm.

In an embodiment, a mass ratio of the silicon nitrides with the two different particle sizes according to particle sizes from large to small is 10:10.

In an embodiment, particle sizes of the sodium silicate powder, the aluminium phosphate powder, the resin powder, the sol powders, the vanadium oxide powder and the borax are all less than or equal to 0.074 mm, a particle size of the silicon powder is less than or equal to 0.044 mm, a particle size of the silicon oxide micronized powder is less than or equal to 5 micrometers (μm) and a particle size of the rare earth oxide micronized powder is less than or equal to 3 μm.

In an embodiment, a corresponding mass ratio of the silicon nitride powders, the sodium silicate powder, the aluminium phosphate powder, the furfuryl alcohol, the silicone resin powder, the silica sol powder, the aluminium sol powder, the silicon oxide micronized powder, the vanadium oxide powder, the silicon powder, the borax and the rare earth oxide micronized powder is 20:10:4:1:5:1:1:2:0.5:0.5:0.5:0.5.

In an embodiment, the refractory material is silicon carbide refractory material in supercharged boiler.

Compared with the prior art, the application has the following beneficial effects:

according to the application, silicone carbides of six different particle sizes optimally proportioned are used as the main materials of the repair material with good synergistic effect to strengthen the repair material. The binding agents in the formula system of the application contains three kinds of composite binding agents: silicone resin as low temperature (below 530° C.) binding agent, the pre-mixed powder of silica sol and aluminium sol as medium temperature (530-1,200° C.) binding agent, and silicon oxide micronized powder and vanadium oxide powder as high temperature (above 1,100° C.) binding agents. The above three types of binding agents can adapt to different temperatures and work in synergy to ensure that the strength of the material is obtained continuously at different temperatures, so that the material has no collapse temperature. Additionally, the silicon nitride powder, sodium silicate powder, aluminium phosphate powder, furfuryl alcohol, silicon powder, borax, rare earth oxide micronized powder, etc. in the binding agents can enhance the mixing. There are different particle size requirements for each raw material in the main materials and binding agents in the formulation system of the application; coarse and fine raw materials of different particle sizes are used to improve the dispersion effect of the raw material particles and enhance the strength of the repair material; therefore the hot repair material of the application can effectively solve the problem of rapid hot repair of silicon carbide refractory materials in supercharged boilers and has a promising prospect of application.

BRIEF DESCRIPTION OF THE DRAWINGS

In order to more clearly explain the embodiments of the application or the technical solutions in the prior art, the drawings needed in the embodiments will be briefly introduced below. Obviously, the drawings in the following description are only some embodiments of the application, and for ordinary technicians in the field, other drawings could be obtained according to these drawings without creative efforts.

DETAILED DESCRIPTION OF THE EMBODIMENTS

Figure 1:
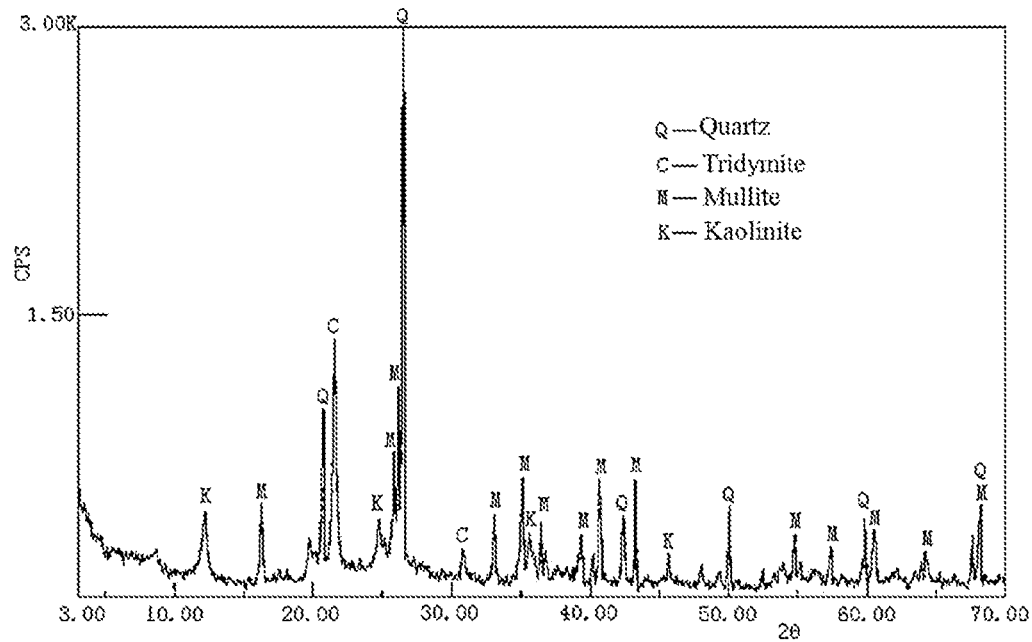
FIG. 1 illustrates a XRD (x-Ray Diffraction) pattern of the repair material prepared in Embodiment 1 after sintering at high temperature.

Now various exemplary embodiments of the application will be described in detail. This detailed description should not be considered as a limitation of the application, but should be understood as a more detailed description of some aspects, characteristics and embodiments of the application.

It should be understood that the terms used in this application are only for describing specific embodiments, and are not used to limit the application. In addition, for the numerical range in the application, it should be understood that each intermediate value between the upper limit and the lower limit of the range is also specifically disclosed. Any stated value or intermediate value within the stated range and any other stated value or every smaller range between intermediate values within the stated range are also included in the application. The upper and lower limits of these smaller ranges could be independently included or excluded from the range.

Unless otherwise specified, all technical and scientific terms used herein have the same meaning as commonly understood by those skilled in the related art. Although the application only describes the preferred methods and materials, any methods and materials similar or equivalent to those described herein could also be used in the practice or testing of the application. All documents mentioned in this specification are incorporated by reference to disclose and describe the methods and/or materials related to the documents. In case of conflict with any incorporated documents, the contents of this description shall prevail.

Without departing from the scope or spirit of the application, it is obvious to those skilled in the related art that many modifications and changes can be made to the specific embodiments of the application. Other embodiments obtained from the description of the application will be obvious to those skilled in the related art. The description and embodiments of that application are exemplary only.

The words "including", "comprising", "having" and "containing" used in this paper are all open terms, that is, they mean including but not limited to.

Embodiment 1

Silicon carbide powders with particle sizes of 1-1.25 mm, 0.5-0.6 mm, 0.25-0.3 mm, 0.1-0.15 mm, 0.044-0.074 mm and 0.038-0.044 mm are separately screened with a sieve and weighed as the main materials of repair material, and the corresponding mass ratio is 8:5:8:15:8:10. Silicon nitride powders, sodium silicate powder, aluminium phosphate powder, furfuryl alcohol, silicone resin powder, silica sol powder, aluminium sol powder, silicon oxide micronized powder, vanadium oxide powder, silicon powder, borax and rare earth oxide micronized powder with a mass ratio of 20:10:4:1:5:1:1:2:0.5:0.5:0.5:0.5 are used as binding agents; among them, the particle sizes of silicon nitride powders are 0.044-0.15 mm and less than or equal to 0.044 mm, corresponding to a mass ratio of 10:10; the particle sizes of sodium silicate powder, aluminum phosphate powder, organic silicon resin powder, silica sol powder, aluminum sol powder, vanadium oxide powder and borax are less than or equal to 0.074 mm, the particle size of silicon oxide micronized powder is less than or equal to 5 m, the particle size of rare earth oxide micronized powder is less than or equal to 3 m, and the particle size of silicon powder is less than or equal to 0.044 mm.

The above powders are fully mixed and stirred in proportion to obtain repair material, which are packaged and stored, and furfuryl alcohol as a liquid raw material is added before use.

The repair material prepared in this embodiment is sintered at 1,300° C. for 4 h, and then subjected to chemical analysis and XRD detection. The composition of the repair material sintered at high temperature is shown in Table 1, and the XRD pattern is shown in FIG. 1.

TABLE 1

| Composition | $SiO_2$ | $Al_2O_3$ | $Fe_2O_3$ | FeO | MgO | CaO | $Na_2O$ |
|---|---|---|---|---|---|---|---|
| Content (wt %) | 45.72 | 39.51 | 1.08 | 0.73 | 0.29 | 1.84 | 0.36 |
| Composition | $K_2O$ | $H_2O^+$ | $H_2O^-$ | $TiO_2$ | $P_2O_5$ | MnO | Loss |
| Content (wt %) | 0.61 | 4.94 | 1.32 | 1.77 | 0.051 | 0.013 | 0.39 |

Embodiment 2

The silicon carbide powders with particle sizes of 1.25-2 mm, 0.6-0.8 mm, 0.3-0.4 mm, 0.15-0.2 mm, 0.044-0.074 mm and 0.038-0.044 mm are separately screened by a sieve and weighed as the main materials of the repair material, and the corresponding mass ratio is 8:5:8:15:8:10. Silicon nitride powders, sodium silicate powder, aluminium phosphate powder, furfuryl alcohol, silicone resin powder, silica sol powder, aluminium sol powder, silicon oxide micronized powder, vanadium oxide powder, silicon powder, borax and rare earth oxide micronized powder are selected as binding agents in the mass ratio of 20:10:4:1:5:1:1:2:0.5:0.5:0.5:0.5. Among them, the particle sizes of silicon nitride powders are 0.15-0.25 mm and less than or equal to 0.044 mm, and the corresponding mass ratio is 10:10; the particle sizes of sodium silicate powder, aluminium phosphate powder, silicone resin powder, silica sol powder, aluminium sol powder, vanadium oxide powder and borax are less than or equal to 0.074 mm; the particle size of silicon oxide micronized powder is less than or equal to m; the particle size of rare earth oxide micronized powder is less than or equal to 3 m; and the particle size of silicon powder is less than or equal to 0.044 mm.

The above powders are fully mixed and stirred in proportion to obtain repair materials, which are packaged and stored, and furfuryl alcohol as a liquid raw material is added before use.

Figure 2:
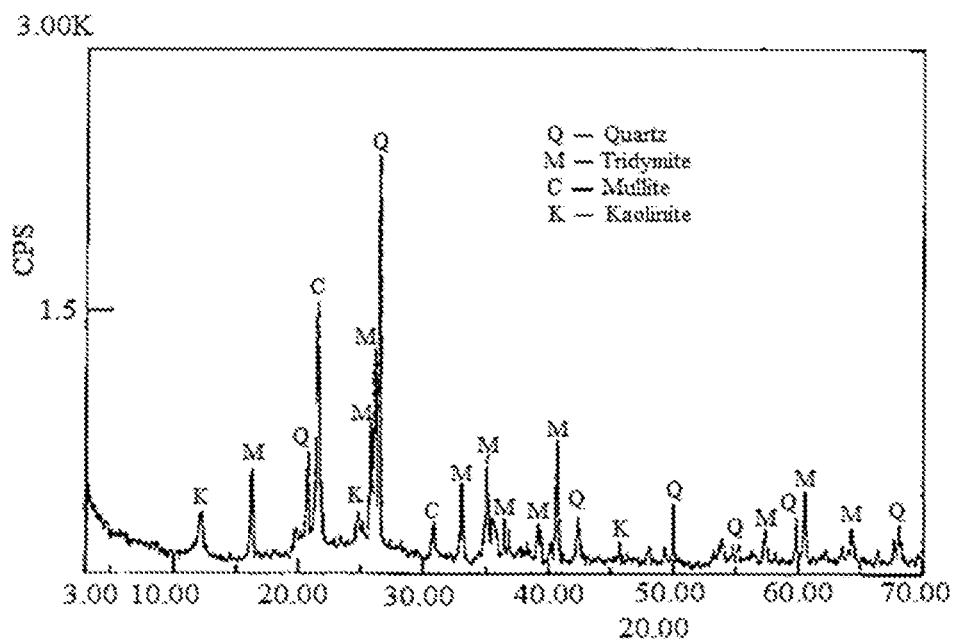
FIG. 2 illustrates a XRD pattern of the repair material prepared in Embodiment 2 after sintering at high temperature.

The repair material prepared in this embodiment is sintered at 1,400° C. for 4 h and then detected by XRD. The XRD pattern is shown in FIG. 2.

Embodiment 3

Silicon carbide powders with particle sizes of 2-2.5 mm, 0.8-0.9 mm, 0.4-0.5 mm, 0.2-0.25 mm, 0.044-0.074 mm and 0.038-0.044 mm are separately screened with a sieve and weighed as the main materials of repair material, and the corresponding mass ratio is 8:5:8:15:8:10. Silicon nitride powders, sodium silicate powder, aluminium phosphate powder, furfuryl alcohol, silicone resin powder, silica sol powder, aluminium sol powder, silicon oxide micronized powder, vanadium oxide powder, silicon powder, borax and rare earth oxide micronized powder are selected as binding agents in the mass ratio of 20:10:4:1:5:1:1:2:0.5:0.5:0.5:0.5. Among them, the particle sizes of silicon nitride powders are 0.25-0.4 mm and less than or equal to 0.044 mm, and the corresponding mass ratio is 10:10; the particle sizes of sodium silicate powder, aluminium phosphate powder, silicone resin powder, silica sol powder, aluminium sol powder, vanadium oxide powder and borax are less than or equal to 0.074 mm; the particle size of silicon oxide micronized powder is less than or equal to 5 m; the particle size of rare earth oxide micronized powder is less than or equal to 3 m; and the particle size of silicon powder less than or equal to 0.044 mm.

The above powders are fully mixed and stirred in proportion to obtain repair material, which is packaged and stored, and furfuryl alcohol as a liquid raw material is added before use.

Embodiment 4

The silicon carbide powders with particle sizes of 2.5-3 mm, 0.9-1 mm, 0.4-0.5 mm, 0.2-0.25 mm, 0.044-0.074 mm and 0.038-0.044 mm are separately screened by a sieve and weighed as the main materials of the repair material, and the corresponding mass ratio is 8:5:8:15:8:10. Silicon nitride powders, sodium silicate powder, aluminium phosphate powder, furfuryl alcohol, silicone resin powder, silica sol powder, aluminium sol powder, silicon oxide micronized powder, vanadium oxide powder, silicon powder, borax and rare earth oxide micronized powder are selected as binding agents in the mass ratio of 20:10:4:1:5:1:1:2:0.5:0.5:0.5:0.5. Among them, the particle sizes of silicon nitride powders are 0.4-0.5 mm and less than or equal to 0.044 mm, and the corresponding mass ratio is 10:10; the particle sizes of sodium silicate powder, aluminium phosphate powder, silicone resin powder, silica sol powder, aluminium sol powder, vanadium oxide powder and borax are less than or equal to 0.074 mm; the particle size of silicon oxide micronized powder is less than or equal to 5 μm; the particle size of rare earth oxide micronized powder is less than or equal to 3 μm; and the particle size of silicon powder is less than or equal to 0.044 mm.

The above powders are fully mixed and stirred in proportion to obtain the repair material, which is packaged and stored, and furfuryl alcohol as a liquid raw material is added before use.

Comparative Embodiment 1

Comparative embodiment 1 is carried out in the same way as Embodiment 1 except that the main materials are all silicon carbide powder with a particle size of 1-1.25 mm, the amount of which is the total amount of the silicon carbide powders of six different particle sizes in Embodiment 1.

Comparative Embodiment 2

Comparative embodiment 2 is carried out in the same way as Embodiment 1, except that silicon nitride powder uses only silicon nitride powder with a particle size of 0.044-0.15 mm, and the amount of silicon nitride powder used is the total amount of silicon nitride powders with the two different particle sizes in Embodiment 1.

Comparative Embodiment 3

Comparative embodiment 3 is carried out in the same way as Embodiment 1, except that the silicone resin powder is not used.

Comparative Embodiment 4

Comparative embodiment 4 is carried out in the same way as Embodiment 1, except that the silica sol powder and the aluminium sol powder are not used.

Comparative Embodiment 5

Comparative embodiment 5 is carried out in the same way as Embodiment 1, except that the silicon oxide micronized powder and the vanadium oxide powder are not used.

Effect Verification

The repair materials prepared in Embodiments 1-4 and Comparative embodiments 1-5 are selected to test their binding strength and flexural strength.

According to GB/T 8642-2002 and GB/T 4513.6-2017, the binding strength and flexural strength of the repair materials are tested respectively. The detailed test results are shown in Table 2:

TABLE 2

|  | Binding strength (MPa) | Flexural strength (MPa) |
| --- | --- | --- |
| Embodiment 1 | 6.3 | 48.1 |
| Embodiment 2 | 5.9 | 46.9 |
| Embodiment 3 | 6.0 | 44.7 |
| Embodiment 4 | 5.5 | 41.9 |
| Comparative embodiment 1 | 4.0 | 32.6 |
| Comparative embodiment 2 | 5.1 | 40.2 |
| Comparative embodiment 3 | 4.5 | 38.8 |
| Comparative embodiment 4 | 4.1 | 34.7 |
| Comparative embodiment 5 | 4.3 | 36.3 |

It could be seen from the test results in Table 2 that the repair material, which is obtained by selecting six kinds of silicon carbide powder with different particle sizes as the main materials, has better performance than that of the repair material obtained by selecting only one kind of silicon carbide powder as the main material, proving that the silicon carbide powders with different particle sizes in the main material has good synergy and could strengthen the strength of the repair material. The performance of the repair material obtained by selecting two different silicon nitride powder with different particle sizes is better than that obtained by selecting only one kind of silicon nitride powder with one particle size, showing that the silicon nitride powder with different particle sizes in the binding agent has a limited synergistic effect, and could improve the performance of the repair material to a certain extent. Performance of the repair material could be impaired by omitting any of the low-temperature binding agent silicone resin, medium-temperature binding agent silica sol and aluminium sol, and high-temperature binding agent silicon oxide micronized powder and vanadium oxide powder, indicating that the low-temperature binding agent, medium-temperature binding agent and high-temperature binding agent components in the repair material in synergy to ensure that the material could continuously gain strength at different temperatures, thus enabling the repair material to have better service performance. Silicon carbide powders of different particle sizes in the main material, silicon nitride powders of different particle sizes in the binding agent, as well as low-temperature binding agent, medium-temperature binding agent and high-temperature binding agent in the binding agent act synergistically to achieve the best performance of the repair material.

The foregoing are only preferred embodiments of the application and are not intended to limit the application. Any modifications, equivalent substitutions and improvements etc. made within the spirit and principles of the application shall fall in the scope of protection of the application.

What is claimed is:

1. A hot repair material of refractory materials, comprising main materials and binding agents as raw materials, wherein the main materials comprise silicon carbide powders with different particle sizes, and the binding agents comprise silicon nitride powders, a sodium silicate powder, an aluminum phosphate powder, a furfuryl alcohol, a resin powder, sol powders, a silicon oxide micronized powder, a vanadium oxide powder, a silicon powder, a borax and a rare earth oxide micronized powder;

wherein a particle size of each of the silicon carbide powders with the different particle sizes is 3-0.038 millimeters (mm), and the silicon carbide powders with the different particle sizes comprise silicon carbides with six different particle sizes;

wherein the six different particle sizes are six selected from the group consisting of 2.5-3 mm, 2-2.5 mm, 1.25-2 mm, 1-1.25 mm, 0.9-1 mm, 0.8-0.9 mm, 0.6-0.8 mm, 0.5-0.6 mm, 0.4-0.5 mm, 0.3-0.4 mm, 0.25-0.3 mm, 0.2-0.25 mm, 0.15-0.2 mm, 0.1-0.15 mm, 0.044-0.074 mm and 0.038-0.044 mm;

wherein a particle size of each of the silicon nitride powders is less than or equal to 0.5 mm, the silicon nitride powders comprise silicon nitrides with two different particle sizes, and the two different particle sizes are selected from one of following four types: less than or equal to 0.044 mm and 0.044-0.15 mm, less than or equal to 0.044 mm and 0.15-0.25 mm, less than or equal to 0.044 mm and 0.25-0.4 mm, and less than or equal to 0.044 mm and 0.4-0.5 mm;

wherein a mass ratio of the silicon nitrides with the two different particle sizes according to particle sizes from large to small is 10:10; and wherein a mass ratio of the silicon carbides with the six different particle sizes according to particle sizes from large to small is 8:5:8:15:8:10.

2. The hot repair material of refractory materials according to claim 1, wherein the resin powder is a silicone resin powder, and the sol powders comprise a silica sol powder and an aluminum sol powder.

3. The hot repair material of refractory materials according to claim 1, wherein particle sizes of the sodium silicate powder, the aluminum phosphate powder, the resin powder, the sol powders, the vanadium oxide powder and the borax are less than or equal to 0.074 mm, a particle size of the silicon powder is less than or equal to 0.044 mm, a particle size of the silicon oxide micronized powder is less than or equal to 5 micrometers (m) and a particle size of the rare earth oxide micronized powder is less than or equal to 3 rm.

4. The hot repair material of refractory materials according to claim 3, wherein a mass ratio of the silicon nitride powders, the sodium silicate powder, the aluminum phosphate powder, the furfuryl alcohol, the silicone resin powder, the silica sol powder, the aluminum sol powder, the silicon oxide micronized powder, the vanadium oxide powder, the silicon powder, the borax and the rare earth oxide micronized powder is 20:10:4:1:5:1:1:2:0.5:0.5:0.5:0.5.

5. The hot repair material of refractory materials according to claim 1, wherein the refractory materials comprise a silicon carbide refractory material in a supercharged boiler.

* * * * *